(12) United States Patent
Entchev et al.

(10) Patent No.: US 11,414,974 B2
(45) Date of Patent: Aug. 16, 2022

(54) GRANULAR CROSSLINKED POLYETHYLENE AS A HYDRAULIC FRACTURING PROPPANT

(71) Applicant: ExxonMobil Upstream Research Company, Spring, TX (US)

(72) Inventors: Pavlin B. Entchev, Spring, TX (US); Robert M. Shirley, The Woodlands, TX (US); Alan A. Galuska, Huffman, TX (US); William Handy, Spring, TX (US); Dragan Stojkovic, Spring, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 172 days.

(21) Appl. No.: 16/938,413

(22) Filed: Jul. 24, 2020

(65) Prior Publication Data

US 2021/0047906 A1 Feb. 18, 2021

Related U.S. Application Data

(60) Provisional application No. 62/951,339, filed on Dec. 20, 2019, provisional application No. 62/944,106, (Continued)

(51) Int. Cl.
*E21B 43/267* (2006.01)
*E21B 47/11* (2012.01)
(Continued)

(52) U.S. Cl.
CPC .............. *E21B 43/267* (2013.01); *C09K 8/80* (2013.01); *E21B 43/14* (2013.01); *E21B 47/11* (2020.05); *E21B 43/11* (2013.01)

(58) Field of Classification Search
CPC ........ E21B 43/267; E21B 47/11; E21B 43/14; E21B 43/11; C09K 8/80
See application file for complete search history.

(56) References Cited

U.S. PATENT DOCUMENTS

2004/0043906 A1 3/2004 Heath
2008/0113879 A1 5/2008 Way et al.
(Continued)

FOREIGN PATENT DOCUMENTS

GB  2359316 A * 8/2001 ............... C09K 8/62
GB  2359316 A   8/2001

OTHER PUBLICATIONS

Chodak et al; "Properties of crosslinked polyolefin-based materials", Progress in Polymer Science, 1995, vol. 20, No. 6, pp. 1166-1179.
(Continued)

*Primary Examiner* — Crystal J. Lee
(74) *Attorney, Agent, or Firm* — Leandro Arechederra, III

(57) ABSTRACT

Hydrocarbon wells including crosslinked polymer granules as a proppant, methods of forming the hydrocarbon wells, and methods of operating the hydrocarbon wells. The hydrocarbon wells include a wellbore that extends within a subsurface region and a downhole tubular that extends within the wellbore and defines a tubular conduit. The hydrocarbon wells also include a plurality of perforations formed within the downhole tubular and a plurality of fractures formed within the subsurface region. The hydrocarbon wells further include the proppant positioned within the plurality of fractures. The proppant includes a plurality of crosslinked polymer granules, and each crosslinked polymer granule has a characteristic dimension of at least 100 micrometers and at most 2 millimeters.

27 Claims, 4 Drawing Sheets

Related U.S. Application Data filed on Dec. 5, 2019, provisional application No. 62/890,185, filed on Aug. 22, 2019, provisional application No. 62/888,214, filed on Aug. 16, 2019.

(51) Int. Cl.
    *C09K 8/80*     (2006.01)
    *E21B 43/14*     (2006.01)
    *E21B 43/11*     (2006.01)

(56) References Cited

U.S. PATENT DOCUMENTS

| | | | |
|---|---|---|---|
| 2009/0087912 A1* | 4/2009 | Ramos | G01N 33/2823 436/27 |
| 2010/0307745 A1* | 12/2010 | Lafitte | E21B 43/26 166/250.12 |
| 2012/0325474 A1 | 12/2012 | Bicerano | |
| 2018/0044574 A1* | 2/2018 | López | C09K 8/80 |
| 2018/0238160 A1* | 8/2018 | Nguyen | E21B 43/26 |

OTHER PUBLICATIONS

Gheysari, DJ, The effect of high-energy electron beam on mechanical and thermal properties of LDPE and HDPE, European Polymer Journal, 2001, pp. 295-302, vol. 37.

\* cited by examiner

GRANULAR CROSSLINKED POLYETHYLENE AS A HYDRAULIC FRACTURING PROPPANT

CROSS-REFERENCE TO RELATED APPLICATIONS

This application claims the benefit of U.S. Provisional Application 62/888,214 filed Aug. 16, 2019 entitled "Crosslinked Granular Polyethylene", and also claims the benefit of U.S. Provisional Application 62/890,185 filed Aug. 22, 2019 entitled "Granular Crosslinked Polyethylene as a Hydraulic Fracturing Proppant" the entireties of which are incorporated by reference herein. This application also claims the benefit of U.S. Provisional Application 62/951,339 filed Dec. 20, 2019. This application also claims the benefit of U.S. Provisional Application 62/944,106, filed Dec. 5, 2019 entitled "Highly Crosslinked Polymer Particulate." This application is also related to U.S. Provisional Application 62/888,221 filed Aug. 16, 2019 entitled "Method of Manufacturing Crosslinked Granular Polyethylene", the entirety of which is incorporated by reference herein. This application is also related to U.S. Provisional Application 62/890,188 filed Aug. 22, 2019 entitled "Granular Crosslinked Polyethylene as a Density Modifier in a Wellbore Operation Fluid Mixture", the entirety of which is incorporated by reference herein. This application is also related to U.S. Provisional Application 62/890,186 filed Aug. 22, 2019 entitled "Granular Crosslinked Polyethylene as a Loss Circulation Material in a Wellbore Operation Fluid", the entirety of which is incorporated by reference herein. This application is also related to U.S. Provisional Application 62/904,993 filed Sep. 24, 2019 entitled "Granular Crosslinked Polyethylene as a Density Modifier in a Wellbore Operation Fluid Mixture", the entirety of which is incorporated by reference herein. This application is also related to U.S. Provisional Application 62/943,978, filed Dec. 5, 2019 entitled "Methods of Manufacturing Highly Crosslinked Polymer Particulate."

This application is also related to U.S. Provisional Application 62/949,302, filed Dec. 17, 2019 entitled "Highly Crosslinked Polymer Particulate and Methods of Manufacturing Highly Crosslinked Polymer Particulate."

FIELD OF THE DISCLOSURE

The present disclosure relates generally to hydrocarbon wells that include crosslinked polymer granules as a proppant, to methods of forming the hydrocarbon wells, and/or to methods of operating the hydrocarbon wells.

BACKGROUND OF THE DISCLOSURE

Completion operations often are performed on hydrocarbon wells to prepare the hydrocarbon wells for production and/or to increase a production rate of hydrocarbon fluids from the hydrocarbon well. A common completion operation is hydraulic fracturing, in which a pressurizing fluid stream may flow into a zone of a subsurface region to fracture the zone of the subsurface region, thereby increasing a fluid permeability thereof. Proppants often are used to "prop" the fracture open, thereby providing a long-term increase in fluid permeability. Conventional proppants include sand and/or ceramics. While conventional proppants are effective under certain conditions, they may be ineffective in others. As an example, conventional proppants generally have a density that is significantly higher than that of the pressurizing fluid stream. As such, conventional proppants tend to settle out of the fracturing fluid stream, which can limit an effective reach and/or depth to which the conventional proppants may be utilized. With this in mind, lower-density proppants may be desirable in certain circumstances. However, it is difficult to obtain lower-density proppants that also exhibit the necessary mechanical, thermal, and/or chemical stability to be effective proppants within hydrocarbon wells. Thus, there exists a need for hydrocarbon wells that include improved proppants, for methods of forming the hydrocarbon wells, and/or for methods of operating the hydrocarbon wells.

Polyethylene is known to have the desirable density ranges that are fairly close to the density range of hydraulics fracturing fluid. To improve its mechanical and thermal properties, the polyethylene is chemically crosslinked and can be further compounded with fillers (e.g. carbon black). These high-strength polyethylene pellets are currently used as intermediate feedstock into extrusion process that produces high-quality plastic products (e.g. high-quality pipes).

SUMMARY OF THE DISCLOSURE

Hydrocarbon wells including crosslinked polymer granules as a proppant, methods of forming the hydrocarbon wells, and methods of operating the hydrocarbon wells are disclosed herein. The hydrocarbon wells include a wellbore, which extends within a subsurface region, and a downhole tubular, which extends within the wellbore and may define a tubular conduit. The hydrocarbon wells also include a plurality of perforations formed within the downhole tubular and a plurality of fractures formed within the subsurface region. The hydrocarbon wells further include a proppant positioned within the plurality of fractures. The proppant may include a plurality of crosslinked polymer granules, and each crosslinked polymer granule may have a characteristic dimension of at least 100 micrometers and at most 2 millimeters. Each crosslinked polymer granule may contain a highly crosslinked polymeric material. The highly crosslinked polymeric material may include a plurality of polyethylene polymer chains and a plurality of chemical crosslinks. The plurality of chemical crosslinks may include chemical crosslinks that covalently bond a given polyethylene polymer chain to another polyethylene polymer chain.

In some examples, the methods include methods of completing a hydrocarbon well. These methods include positioning a perforation device, perforating a downhole tubular, pressurizing a tubular conduit, and flowing a proppant, which includes a plurality of crosslinked polymer granules, into a fracture. The positioning may include positioning the perforation device within the tubular conduit, which may be defined by the downhole tubular. The downhole tubular may extend within a wellbore of the hydrocarbon well, and the wellbore may extend within a subsurface region. The perforating may include perforating the downhole tubular with the perforation device to define a perforation within the downhole tubular. The pressurizing may include pressurizing the tubular conduit with a pressurizing fluid stream that includes a pressurizing fluid. The pressurizing further may include pressurizing to fracture a zone of the subsurface region that is proximate the perforation and/or to form the fracture. The flowing may include flowing the proppant into the fracture, via the perforation, to prop the fracture with the proppant.

In some examples, the methods include methods of operating a hydrocarbon well having a plurality of fractures in which a proppant that includes a plurality of crosslinked polymer granules is positioned. These methods include producing a produced fluid stream, which includes a hydrocarbon fluid, from the hydrocarbon well. The producing may include flowing the hydrocarbon fluid from a subsurface region and/or into a tubular conduit of a downhole tubular of the hydrocarbon well via a fracture that extends within the subsurface region. When the proppant includes a tracer material, the methods also may include, during the flowing, entraining a fraction of the tracer material within the hydrocarbon fluid. Such methods further may include, during the producing, detecting a presence of the tracer material within the hydrocarbon fluid that is produced from the hydrocarbon well.

DETAILED DESCRIPTION AND BEST MODE OF THE DISCLOSURE

Figure 1:
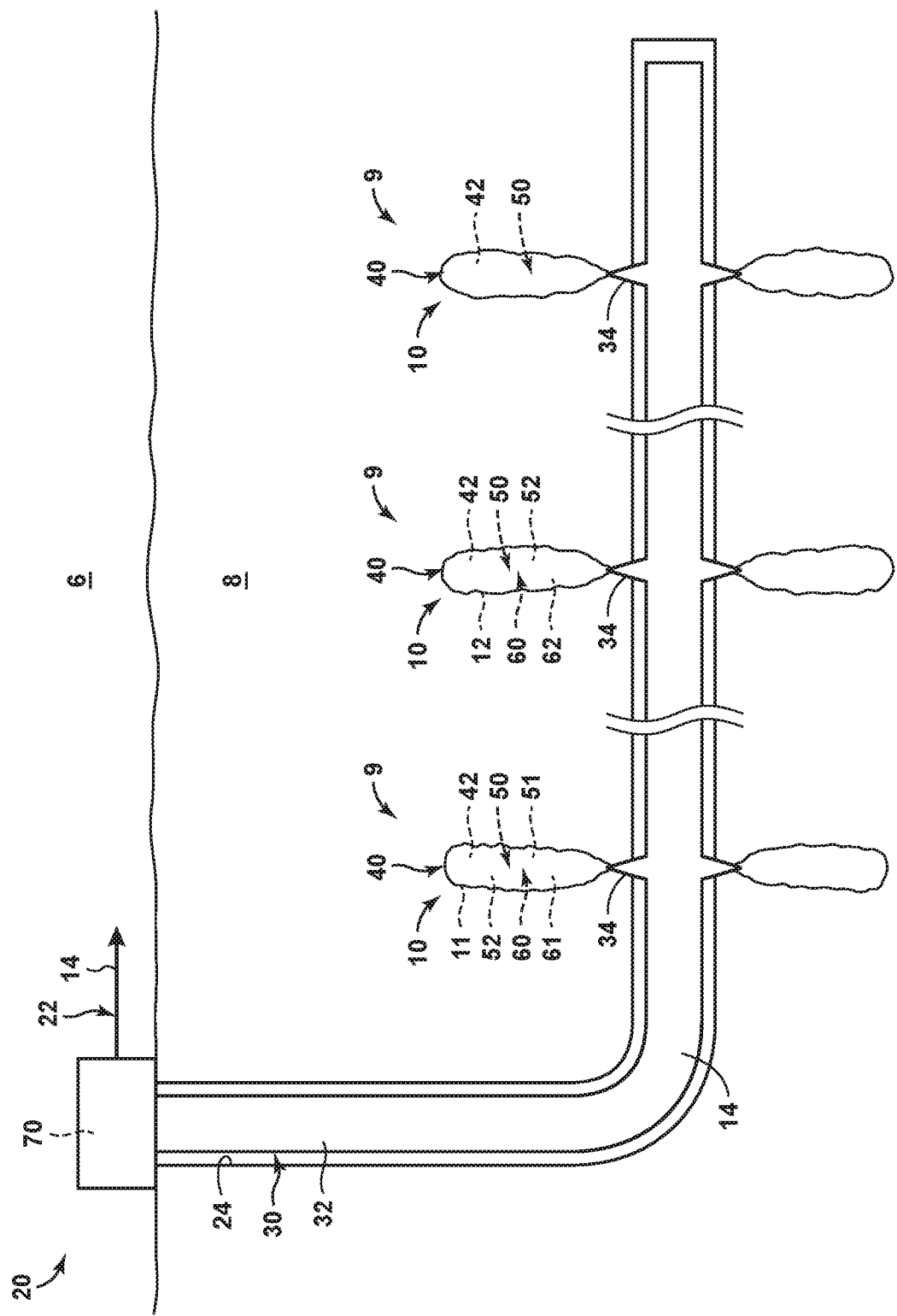
FIG. 1 is a schematic illustration of examples of a hydrocarbon well according to the present disclosure.

FIGS. 1-7 provide examples of hydrocarbon wells 20, of methods 500 of completing hydrocarbon wells, of methods 600 of operating hydrocarbon wells, and/or of proppants 40, according to the present disclosure. Elements that serve a similar, or at least substantially similar, purpose are labeled with like numbers in each of FIGS. 1-7, and these elements may not be discussed in detail herein with reference to each of FIGS. 1-7. Similarly, all elements may not be labeled in each of FIGS. 1-7, but reference numerals associated therewith may be utilized herein for consistency. Elements, components, and/or features that are discussed herein with reference to one or more of FIGS. 1-7 may be included in and/or utilized with any of FIGS. 1-7 without departing from the scope of the present disclosure.

In general, elements that are likely to be included in a particular embodiment are illustrated in solid lines, while elements that are optional are illustrated in dashed lines. However, elements that are shown in solid lines may not be essential and, in some embodiments, may be omitted without departing from the scope of the present disclosure.

FIG. 1 is a schematic illustration of examples of a hydrocarbon well 20 according to the present disclosure. Hydrocarbon wells 20 include a wellbore 24 that extends within a subsurface region 8. Wellbore 24 also may be referred to herein as extending between a surface region 6 and the subsurface region. Hydrocarbon wells 20 also include a downhole tubular 30 that extends within wellbore 24 and defines a tubular conduit 32. Downhole tubular 30 includes a plurality of perforations 34 and a plurality of fractures 10 formed within subsurface region 8. As discussed in more detail herein, each fracture 10 may be formed responsive to flow of a pressurizing fluid stream through a corresponding perforation 34. As such, each fracture 10 may be proximate and/or associated with the corresponding perforation 34.

Hydrocarbon wells 20 further include a proppant 40 positioned within the plurality of fractures 10. As discussed in more detail herein, proppant 40 includes a plurality of crosslinked polymer granules 50. Each crosslinked polymer granule may include and/or contain a highly crosslinked polymeric material that includes a plurality of polyethylene polymer chains and a plurality of chemical crosslinks. The plurality of chemical crosslinks may include crosslinks that covalently bond a given polyethylene polymer chain of the plurality of polyethylene polymer chains to another polyethylene polymer chain of the plurality of polyethylene polymer chains. A characteristic dimension of each crosslinked polymer granule may be within a threshold characteristic dimension range, examples of which are disclosed herein.

In some examples, and in addition to crosslinked polymer granules 50, proppant 40 may include a conventional proppant 42. Examples of the conventional proppant include sand, bauxite, and/or ceramic granules or particulate. The conventional proppant may have a conventional proppant density that is greater than a granule density of the crosslinked polymer granules. As examples, the conventional proppant density may be at least 1.5 grams per cubic centimeter (g/cc), at least 2 g/cc, at least 2.5 g/cc, at least 3 g/cc, and/or at least 3.5 g/cc. As additional examples, the conventional proppant density may be at least 1.5 times greater than the granule density, at least 2 times greater than the granule density, at least 2.5 times greater than the granule density, at least 3 times greater than the granule density, and/or at least 3.5 times greater than the granule density.

Cross-linked polyethylene is lightweight (around density of fracturing fluid), thermally and chemically stable, and mechanically strong (e.g. at temperature of 85 degrees Celsius, and under a uniaxial stress of 35 Megapascals it does not deform more than 10% after 8 weeks exposure to a typical crude). The pellets of cross-linked polyethylene are currently used as feedstock for extrusion into other high-quality plastic products (e.g. pipes that can sustain high temperature and pressure). This art describes use of such highly cross-linked natural or compounded polyethylene pellets, further pulverized (grinded into smaller beads), for example by using cryogenic milling, into beads that are suitable for proppant applications in hydraulics fracturing as high-strength lightweight material. Furthermore, this art describes a novel variation of hydraulics fracturing in which a strong material that is lighter than the fracturing fluid is used as proppant.

In some such examples, the conventional proppant and the plurality of crosslinked polymer granules both may be positioned within each fracture 10. Stated another way, each fracture may include both the conventional proppant and the plurality of crosslinked polymer granules. In some examples, the conventional proppant and the plurality of crosslinked polymer granules may be uniformly distributed throughout the plurality of fractures 10. However, this is not required to all embodiments. For example, in some examples, the conventional proppant may be preferentially positioned within a first fracture subset of the plurality of fractures, and the plurality of crosslinked polymer granules may be preferentially positioned within a second fracture subset of the plurality of fractures. This preferential positioning of the conventional proppant and the plurality of crosslinked polymer granules may be passively created, such as may be a result of a difference between the conventional proppant density and the granule density. As an example, the crosslinked polymer granules may be preferentially positioned within relatively higher regions of the subsurface region and/or within fractures that are associated with relatively higher perforations, while the conventional proppant may be preferentially positioned within relatively lower regions of the subsurface region and/or within fractures that are associated with relatively lower perforations. As another example, the crosslinked polymer granules may be preferentially positioned within fractures that are associated with more downhole portions of the hydrocarbon well, while the conventional proppant may be preferentially positioned within relatively more uphole portions of the hydrocarbon well.

Additionally or alternatively, this preferential positioning of the conventional proppant and the plurality of crosslinked polymer granules may be actively and/or purposefully created. As an example, during completion of the hydrocarbon well, and as discussed in more detail herein with reference to methods 500 of FIG. 2, the proppants may be provided to the wellbore and/or flowed into the fractures such that the conventional proppant is preferentially positioned within the first fracture subset and the plurality of crosslinked polymer granules is preferentially positioned within the second fracture subset.

In some examples, the plurality of crosslinked polymer granules 50 may have and/or exhibit a granule density distribution, or a predetermined granule density distribution. Stated another way, the granule density of a given crosslinked polymer granule may differ from the granule density of another crosslinked polymer granule, and this variation in granule density may be predetermined, predefined, and/or purposefully present and/or created.

In some examples, the predetermined granule density distribution may be a unimodal distribution. Examples of unimodal distribution include a Gaussian distribution, an at least substantially Gaussian distribution, a normal distribution, and/or an at least substantially normal distribution. Stated another way, the predetermined granule density distribution may include variation, or random variation, about a single average value, such as may be due to and/or a result of variation, or random variation, in a process utilized to create and/or manufacture the plurality of crosslinked polymer granules.

In some examples, the predetermined density distribution may be a multi-modal distribution. Examples of the multi-modal distribution include a bimodal distribution, an at least substantially bimodal distribution, a trimodal distribution, and/or an at least substantially trimodal distribution. Stated another way, a first granule subset 51 of the plurality of crosslinked polymer granules may have and/or define a first average granule density, and a second granule subset 52 of the plurality of crosslinked polymer granules may have and/or define a second average granule density. The first average granule density may differ from the second average granule density. As examples, the first average granule density may be at least 1.1, at least 1.2, at least 1.3, at least 1.4, at least 1.5, at least 1.6, at least 1.8, and/or at least 2 times larger than the second average granule density. As another example, the first average granule density may be greater than a density of the hydrocarbon fluid and/or may be such that the first granule subset is negatively buoyant within the hydrocarbon fluid. As yet another example, the second average granule density may be less than the density of the hydrocarbon fluid and/or may be such that the second granule subset is positively buoyant within the hydrocarbon fluid.

In some such examples, first granule subset 51 and second granule subset 52 may be equally, or at least substantially equally, distributed within the plurality of fractures 10. Stated another way, each fracture of the plurality of fractures may include equal, or at least substantially equal, proportions of the first granule subset and the second granule subset. This is schematically illustrated in FIG. 1 by first fracture 11 being illustrated as optionally including both first granule subset 51 and second granule subset 52.

In other such examples, the first granule subset may be preferentially positioned within a first fracture subset of the plurality of fractures 10, and the second granule subset may be preferentially positioned and/or distributed within a second fracture subset of the plurality of fractures 10. This is schematically illustrated in FIG. 1 by first fracture 11 being illustrated as optionally including first granule subset 51 and second fracture 12 being illustrated as optionally including second granule subset 52.

The first fracture subset, the second fracture subset, and/or a fraction of crosslinked polymer granules 50 from first granule subset 51 and/or second granule subset 52 that is positioned within a given fracture 10 may be selected and/or established in any suitable manner. As an example, a density difference between the first granule subset and the second granule subset, such as may be quantified and/or described by a difference between the first average granule density and the second average granule density, may cause the first granule subset and the second granule subset to preferentially and/or passively be positioned within the first fracture subset and the second fracture subset. As a more specific example, the first granule subset may be preferentially positioned within fractures that are relatively farther uphole and/or that are associated with perforations that are relatively lower and/or on a bottom side of the downhole tubular. As another more specific example, the second granule subset may be preferentially positioned within fractures that are relatively farther downhole and/or that are associated with perforations that are relatively higher and/or on a top side of the downhole tubular. As yet another example, and during completion of the hydrocarbon well, the first granule subset and the second granule subset may be selectively provided to specific fractures 10, as discussed in more detail herein.

In some examples, proppant 40 may include a tracer material 60. The tracer material may be configured to be detected downhole and/or while positioned within fractures 10, such as to provide information relating to the location of the proppant and/or fractures within the subsurface region. Additionally or alternatively, the tracer material may be configured to dissolve and/or to be entrained within a hydrocarbon fluid 14 that extends within wellbore 24 and to be detected upon production of the hydrocarbon fluid from the hydrocarbon well within a produced fluid stream 22. As discussed in more detail herein, this detection of tracer material 60 may be utilized to indicate and/or to quantify production volumes from various fractures 10 and/or from various zones and/or regions of subsurface region 8.

Tracer material 60 may be dissolved and/or entrained within hydrocarbon fluid 14 in any suitable manner. As an example, tracer material 60 may be, or may be selected to be, soluble within the hydrocarbon fluid. As another example, tracer material 60 may be mixed with crosslinked polymer granules 50 and may flow from fractures 10 in and/or within the hydrocarbon fluid that defines produced fluid stream 22.

As yet another example, tracer material 60 may be incorporated into and/or bound to crosslinked polymer granules 50, and the crosslinked polymer granules may flow from fractures 10 in and/or within hydrocarbon fluid 14 that defines the produced fluid stream. Examples of tracer material 60 include a radio frequency identification tag, a chemical tracer material that is chemically distinct from a remainder of the crosslinked polymer granules, and/or a radioactive tracer material.

When proppant 40 includes tracer material 60, hydrocarbon wells 20 also may include a tracer detection structure 70. Tracer detection structure 70, when present, may be configured to detect tracer material 60 within subsurface region 8 and/or within produced fluid stream 22. This may include detection of a presence of the tracer material within the produced fluid stream and/or the subsurface region, detection of a concentration of the tracer material within the produced fluid stream and/or the subsurface region, and/or detection of an identity of the tracer material within the produced fluid stream and/or the subsurface region. Examples of tracer detection structure 70 include a radio frequency transmitter, a radio frequency receiver, a chemical detector, and/or a radioactivity detector.

In some examples, hydrocarbon wells 20 may include a plurality of distinct, of distinctly identifiable, and/or of distinctly detectable tracer materials 60. As an example, a first tracer material may be associated with a proppant 40 that is positioned within a first fracture 11, while a second tracer material may be associated with a proppant 40 that is positioned within a second fracture 12. The first tracer material may differ from the second tracer material such that tracer detection structure may detect and/or may individually identify the first tracer material and/or the second tracer material. Such a configuration may permit and/or facilitate calculation, estimation, and/or determination of relative production volumes from various zones of subsurface region 8 and/or from various fractures 10 that extend within the subsurface region, as discussed in more detail herein.

Figure 2:
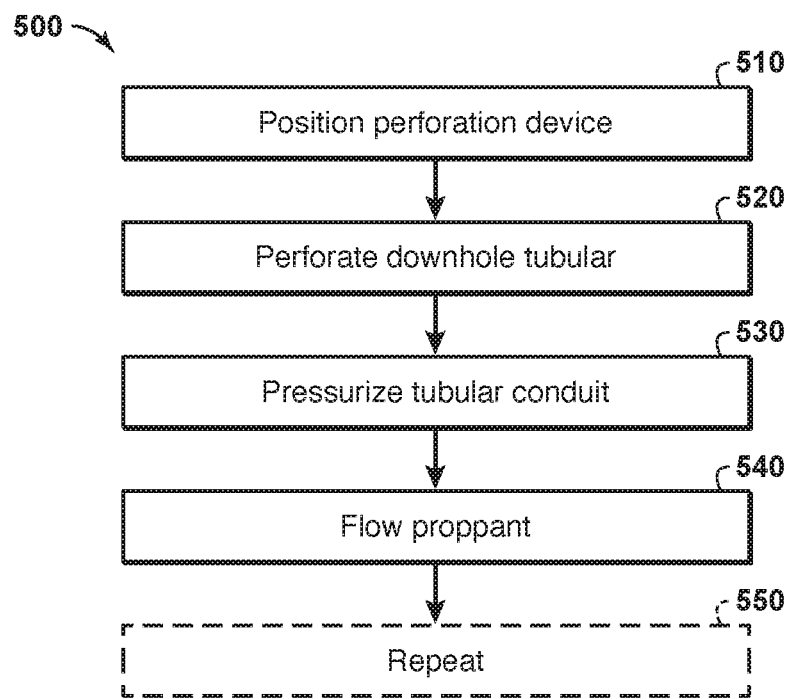
FIG. 2 is a flowchart depicting examples of methods of completing a hydrocarbon well, according to the present disclosure.
Figure 3:
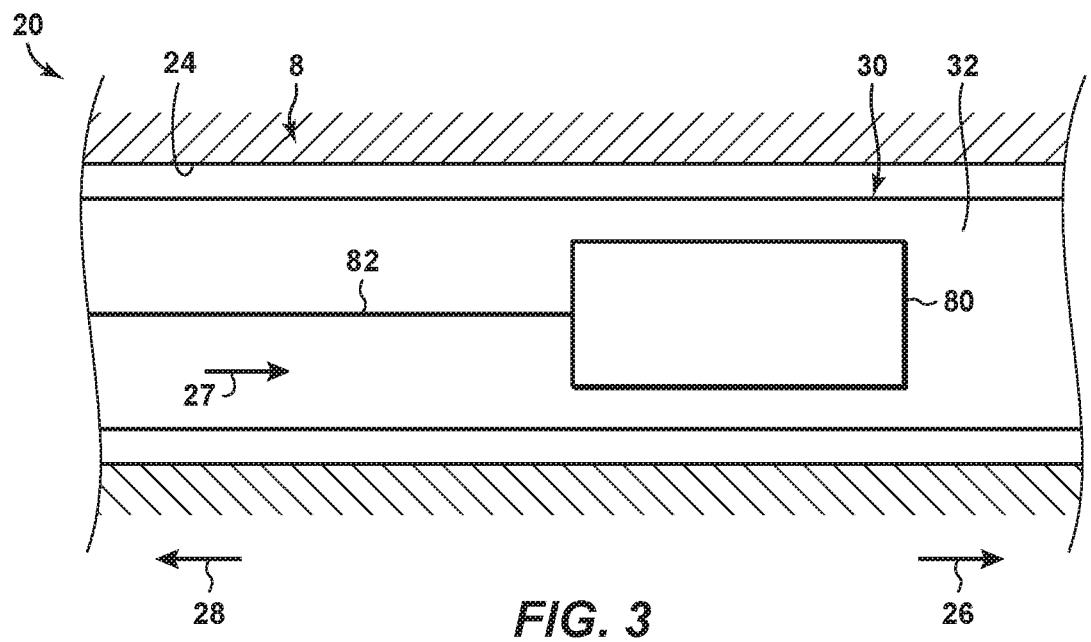
FIG. 3 is a schematic illustration of a portion of the method of FIG. 2.
Figure 4:
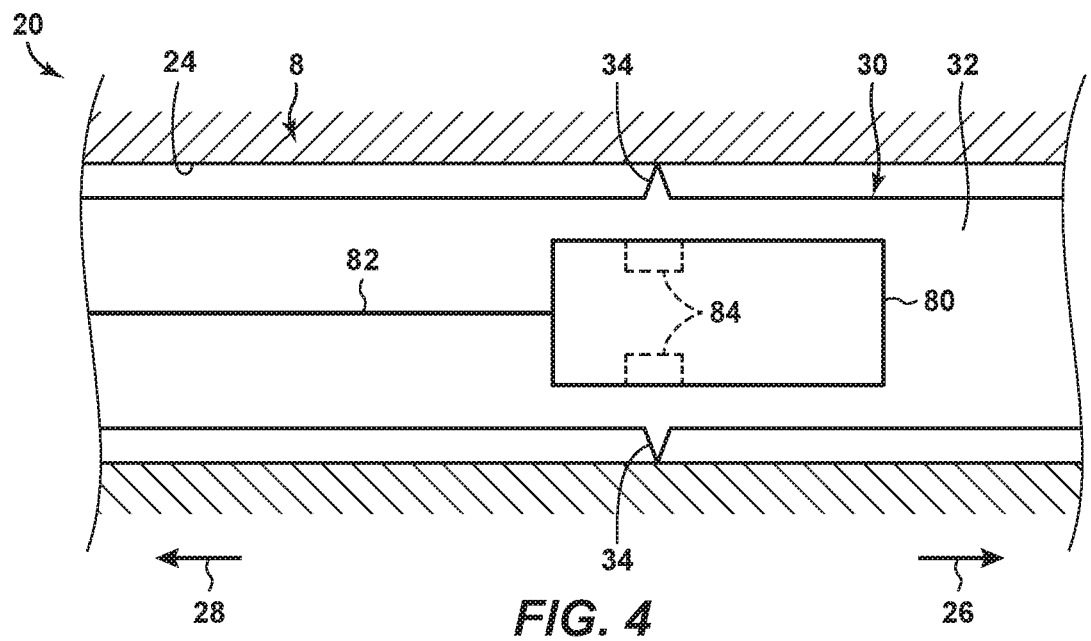
FIG. 4 is another schematic illustration of a portion of the method of FIG. 2.
Figure 5:
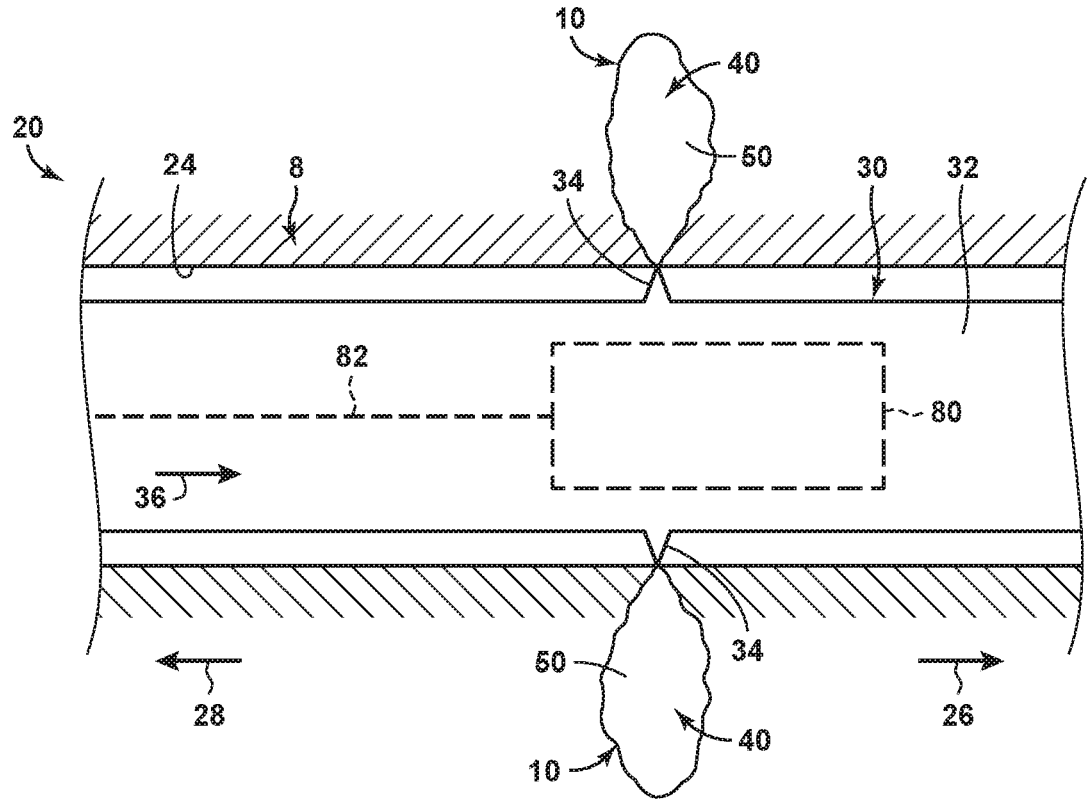
FIG. 5 is another schematic illustration of a portion of the method of FIG. 2.

FIG. 2 is a flowchart depicting examples of methods 500 of completing a hydrocarbon well, according to the present discourse, such as hydrocarbon well 10 of FIG. 1. FIGS. 3-5 are schematic illustrations of portions of the method of FIG. 2. As illustrated in FIG. 2, methods 500 include positioning a perforation device at 510, perforating a downhole tubular at 520, and pressurizing a tubular conduit at 530. Methods 500 also include flowing a proppant at 540 and may include repeating at least a portion of the methods at 550.

Positioning the perforation device at 510 may include positioning the perforation device within a tubular conduit of a downhole tubular of the hydrocarbon well. The downhole tubular may extend within a wellbore of the hydrocarbon well, and the wellbore may extend within a subsurface region. An example of the positioning at 510 is illustrated in FIG. 3. As illustrated therein, the positioning at 510 may include positioning a perforation device 80 within a tubular conduit 32 of a downhole tubular 30. The downhole tubular extends and/or is positioned within a wellbore 24 of a hydrocarbon well 20 and the wellbore extends within a subsurface region 8.

The positioning at 510 may be performed in any suitable manner. As an example, the positioning at 510 may include flowing the perforation device in a downhole direction 26 and/or in and/or within a conveyance fluid stream 27 that may be provided to the tubular conduit. As another example, and as illustrated in FIG. 3, an umbilical 82 may be utilized to position the perforation device within the tubular conduit and/or to retain the perforation device within a target and/or a desired region of the tubular conduit. As another example, the umbilical may be utilized to pull the perforation device in an uphole direction 28 to position the perforation device within the tubular conduit and/or within the desired region of the tubular conduit. Examples of umbilical 82 include a slickline, a wireline, coiled tubing, and/or a workover string.

Perforating the downhole tubular at 520 may include perforating the downhole tubular with the perforation device. This may include creating a perforation, or a plurality of perforations, within the downhole tubular. An example of the perforating at 520 is illustrated schematically in FIG. 4. As illustrated therein, perforation device 80 has been utilized to create and/or to define a plurality of perforations 34 within downhole tubular 30.

The perforating at 520 may be accomplished in any suitable manner. As an example, the perforation device may include and/or be a shaped charge perforation device that includes a plurality of shaped charges 84. In this example, the perforating at 520 may include igniting and/or discharging at least a subset of the plurality of shaped charges to form and/or define perforations 34 within the downhole tubular.

Pressurizing the tubular conduit at 530 may include pressurizing the tubular conduit with, via, and/or utilizing a pressurizing fluid stream. The pressurizing fluid stream may include and/or may be defined by a pressurizing fluid, and the pressurizing at 530 may include pressurizing to fracture a zone of the subsurface region that is proximate the perforation. The pressurizing at 530 is illustrated in FIG. 5. As illustrated therein, pressurizing fluid stream 36 may be provided to tubular conduit 32 and may pressurize the tubular conduit. This may cause fluid within the tubular conduit to flow into subsurface region 8 via perforations 34, which may locally pressurize the subsurface region and/or may generate fractures 10 within the subsurface region. Examples of the pressurizing fluid stream include an incompressible fluid, an at least substantially incompressible fluid, a liquid, and/or water.

FIG. 5 illustrates perforation device 80 in dashed lines to indicate that the perforation device may, but is not required to be, within tubular conduit 32 during the pressurizing at 530. As an example, the pressurizing at 530 may be performed while the perforation device still is positioned within the tubular conduit. Such a configuration may permit and/or facilitate more rapid formation of fractures 10 and/or may permit fractures 10 to be formed by methods 500 that perform the pressurizing at 530 prior to performing the perforating at 520. In such examples, formation of fractures 10 may be referred to herein as being responsive to and/or a result of the perforating at 520, as the perforating at 520 may permit and/or facilitate flow of pressurized fluid from the tubular conduit and/or into the subsurface region.

As another example, subsequent to the perforating at 520 and prior to the pressurizing at 530, methods 500 may include removing the perforation device from the tubular conduit. The removing may be accomplished, for example, by pulling the perforation device in uphole direction 28 and/or from the tubular conduit utilizing umbilical 82. Such a configuration may decrease a potential for wear of and/or damage to the perforation device, such as may be a result of abrasion of the perforation device by the proppant during the flowing at 540.

Flowing the proppant at 540 may include flowing the proppant into the fracture via the perforation. This may include flowing the proppant into the fracture to prop the fracture, to decrease a potential for closure of the fracture, to decrease an amount of closure of the fracture, and/or to increase a fluid permeability of the fracture subsequent to completion of the hydrocarbon well utilizing methods 500. The proppant includes a plurality of crosslinked polymer granules, and examples of the proppant and/or of the plurality of crosslinked polymer granules are disclosed herein.

The flowing at 540 may be accomplished in any suitable manner. As an example, the flowing at 540 may include entraining the proppant in and/or within the pressurizing fluid stream such that the proppant flows into the fracture in and/or within the pressurizing fluid stream. This may include providing a pressurizing slurry stream, which includes the pressurizing fluid and the proppant, to the tubular conduit during and/or subsequent to the pressurizing at 530.

An example of the flowing at 540 is illustrated schematically in FIG. 5. As illustrated therein, the flowing at 540 may position proppant 40 within fractures 10. As discussed, proppant 40 includes crosslinked polymer granules 50 and may include one or more additional components, examples of which are disclosed herein.

In some examples, a density, or an average density, of the plurality of crosslinked polymer granules may be matched to a density of the pressurizing fluid stream to within a predetermined density differential. As examples, the average density of the plurality of crosslinked polymer granules may be at least 75%, at least 80%, at least 85%, at least 90%, at least 95%, at least 97.5%, at least 99%, equal to, at most 125%, at most 120%, at most 115%, at most 110%, at most 105%, at most 102.5%, and/or at most 101% of the density of the pressurizing fluid stream.

This may be in direct contrast to conventional proppants, which may have densities that are at least 200% of the density of the pressurizing fluid stream, and this density match between the crosslinked polymer granules and the pressurizing fluid stream may decrease a potential for the crosslinked polymer granules to settle out of the pressurizing fluid stream during the flowing at 540. Stated another way, the crosslinked polymer granules, which are disclosed herein, may remain entrained within the pressurizing fluid stream under conditions in which conventional proppants would separate from and/or settle out of the pressurizing fluid stream. With this in mind, the crosslinked polymer granules disclosed herein may be utilized to prop fractures under conditions in which conventional proppants may be ineffective, such as under conditions of lower flow rates of the pressurizing fluid stream and/or longer distances between the surface region and the fracture.

In some examples, and as discussed, the plurality of crosslinked polymer granules, or at least a positively buoyant subset of the plurality of crosslinked polymer granules, may be positively buoyant within the pressurizing fluid stream. Such a configuration may permit and/or facilitate preferential flow of the positively buoyant crosslinked polymer granules into fractures associated with upper regions of the downhole tubular and/or with perforations that are relatively higher and/or on a top side of the downhole tubular.

Additionally or alternatively, the plurality of crosslinked polymer granules, or at least a negatively buoyant subset of the plurality of crosslinked polymer granules, may be negatively buoyant within the pressurizing fluid stream. Such a configuration may permit and/or facilitate preferential flow of the negatively buoyant crosslinked polymer granules into fractures associated with lower regions of the downhole tubular and/or with perforations that are relatively lower and/or on a bottom side of the downhole tubular.

In some examples, the plurality of crosslinked polymer granules may include both the positively buoyant fraction and the negatively buoyant fraction. Such a configuration may permit and/or facilitate more complete and/or uniform propping of fractures, regardless of the location of the fracture and/or of the location of the perforation that is associated with the fracture.

In some examples, and as discussed in more detail herein, the proppant may, in addition to the plurality of crosslinked polymer granules, also include a conventional proppant. Examples of the conventional proppant are disclosed herein. The conventional proppant may have a conventional proppant density that is greater than the granule density of the plurality of crosslinked polymer granules. Examples of the conventional proppant density are disclosed herein.

When the proppant includes both the plurality of crosslinked polymer granules and the conventional proppant, the flowing at 540 may include flowing both the conventional proppant and the plurality of crosslinked polymer granules into the fracture. Stated another way, the flowing at 540 may include flowing a proppant mixture, which includes both the plurality of crosslinked polymer granules and the conventional proppant, and/or concurrently flowing both the plurality of crosslinked polymer granules and the conventional proppant.

Additionally or alternatively, the flowing at 540 may include initially flowing one of the conventional proppant and the plurality of crosslinked polymer granules into the fracture and subsequently flowing the other of the conventional proppant and the plurality of crosslinked polymer granules into the fracture. Such a configuration may permit and/or facilitate stratification, layering, and/or segregation of the conventional proppant and the plurality of crosslinked polymer granules within the fracture and may, under certain conditions, produce and/or generate improved and/or increased propping of and/or fluid permeability within the fracture subsequent to the flowing at 540.

Repeating at least the portion of the methods at 550 may include repeating any suitable step and/or steps of methods 500 in any suitable manner and/or in any suitable order. As an example, the repeating at 550 may include repeating the positioning at 510, the perforating at 520, the pressurizing at 530, and the flowing at 540 to fracture and prop a plurality of spaced-apart zones of the subsurface region. This is illustrated schematically in FIG. 1, with fractures 10 extending within three spaced-apart zones 9 of subsurface region 8.

When methods 500 include the repeating at 550, the repeating the flowing at 540 may include flowing the plurality of crosslinked polymer granules, the conventional proppant, and/or both the plurality of crosslinked polymer granules and the conventional proppant into each fracture and/or into fractures associated with each zone of the plurality of zones. Additionally or alternatively, and when methods 500 include the repeating at 550, the repeating the flowing at 540 may include preferentially flowing the conventional proppant into fractures associated with a first zone subset of the plurality of spaced-apart zones and preferentially flowing the plurality of crosslinked polymer granules into fractures associated with a second zone subset of the plurality of spaced-apart zones.

As a specific example, and during the repeating at 550, the flowing at 540 may include flowing the conventional proppant, which may be less expensive and/or more readily available relative to the plurality of crosslinked polymer granules, into fractures associated with more uphole zones of the subsurface region. In this example, the flowing at 540 also may include flowing the plurality of crosslinked polymer granules, which may more readily remain in suspension within the fracturing fluid relative to the conventional proppant, into more downhole zones of the subsurface region.

Such a configuration may permit and/or facilitate performing completion operations within a given hydrocarbon well utilizing relatively lower overall, or average, flow rates of the fracturing fluid stream and/or may permit and/or facilitate propping of zones of the subsurface region that are farther downhole than otherwise would be feasible utilizing solely conventional proppant.

Figure 6:
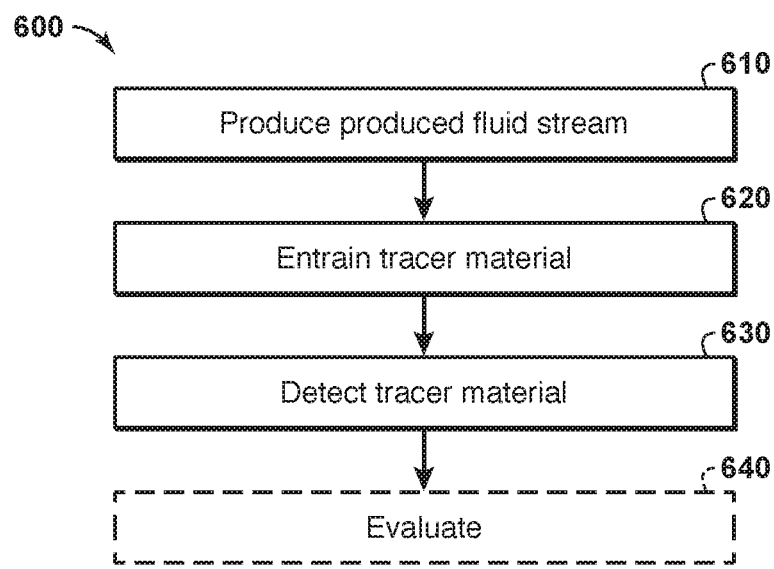
FIG. 6 is a flowchart depicting examples of methods of operating a hydrocarbon well, according to the present disclosure.

FIG. 6 is a flowchart depicting examples of methods 600 of operating a hydrocarbon well, according to the present disclosure. Methods 600 include producing a produced fluid stream at 610, entraining a tracer material at 620, and detecting the tracer material at 630. Methods 600 also may include evaluating at 640.

Producing the produced fluid stream at 610 may include producing the produced fluid stream from the hydrocarbon well. The produced fluid stream may include a hydrocarbon fluid, and the producing at 610 may include flowing the hydrocarbon fluid from a subsurface region and into a tubular conduit of a downhole tubular of the hydrocarbon well via a fracture that extends within the subsurface region. The downhole tubular also may extend within the subsurface region, and a proppant may be positioned within the fracture. The proppant is at least partially defined by a plurality of crosslinked polymer granules and a tracer material. Examples of the hydrocarbon well are disclosed herein with reference to hydrocarbon well 20. Examples of the proppant are disclosed herein with reference to proppant 40. Examples of the tracer material are disclosed herein with reference to tracer material 60.

Entraining the tracer material at 620 may include entraining the tracer material, a fraction of the tracer material, and/or a subset of the tracer material within the hydrocarbon fluid that is produced in and/or within the produced fluid stream. The entraining at 620 may be accomplished in any suitable manner. As an example, the entraining at 620 may include dissolving the tracer material within the hydrocarbon fluid. As another example, the entraining at 620 may include dissolving a portion and/or region of the proppant to release the tracer material into the hydrocarbon fluid. As yet another example, the entraining at 620 may include entraining a particulate tracer material, which may be separate and/or distinct from a remainder of the proppant, within the hydrocarbon fluid.

Detecting the tracer material at 630 may include detecting the tracer material, detecting a presence of the tracer material, and/or detecting a concentration of the tracer material within the produced fluid stream and/or within the hydrocarbon fluid that is produced from the hydrocarbon well. This may include detecting with, via, and/or utilizing a tracer detection structure, examples of which are disclosed herein with reference to tracer detection structure 70.

Evaluating at 640 may include evaluating, establishing, and/or determining any suitable property and/or parameter of the hydrocarbon well and may be based, at least in part, on the detecting at 630. As an example, the evaluating at 640 may include determining and/or verifying that the hydrocarbon fluid was produced via the fracture based, at least in part, on the detecting. Stated another way, detection of the tracer material, during the detecting at 630, may be utilized to indicate that the hydrocarbon fluid flowed through the fracture during the producing at 610 and thus entrained the tracer material during the entraining at 620. Stated yet another way, the evaluating at 640 may include determining that at least a subset of the produced fluid stream was produced via the fracture that includes the tracer material.

As another example, and as discussed in more detail herein, the hydrocarbon well may include a plurality of fractures. In such examples, each fracture, or at least a subset of the plurality of fractures, may include a corresponding tracer material, and the producing at 610 may include producing the hydrocarbon fluid via the plurality of fractures. Also in such examples, the entraining at 620 may include entraining a corresponding fraction of the corresponding tracer material from each fracture of the plurality of fractures, and the detecting at 630 may include detecting a presence and/or a concentration of the corresponding tracer material from each fracture. In such a configuration, the evaluating at 640 may include estimating a production volume from each fracture of the plurality of fractures based, at least in part, on the detecting at 630. As an example, the concentration of each corresponding tracer material may be utilized to estimate, or may be indicative of, the production volume, or a relative production volume, from the corresponding fracture that includes the corresponding tracer material.

Figure 7:
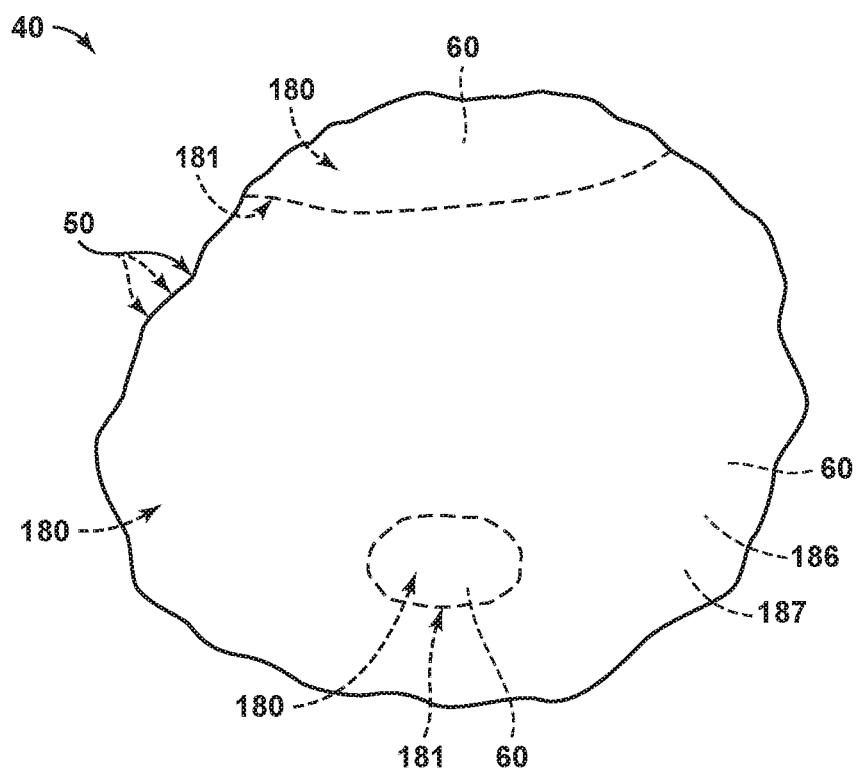
FIG. 7 is a schematic illustration of examples of a proppant in the form of a plurality of crosslinked polymer granules, according to the present disclosure.

FIG. 7 is a schematic illustration of examples of a proppant 40 in the form of a plurality of crosslinked polymer granules 50, according to the present disclosure. Proppant 40 of FIG. 7 may include and/or be a more detailed illustration of proppant 40 illustrated in FIGS. 1 and 5 and/or of the proppant discussed herein with reference to methods 500 and 600 of FIGS. 2 and 6, respectively. With this in mind, any of the structures, functions, and/or features of proppant 40 that are discussed herein with reference to FIG. 7 may be included in and/or utilized with the proppant of FIGS. 1-2 and 5-6 without departing from the scope of the present disclosure. Similarly, any of the structures, functions, and/or features that are discussed herein with reference to the proppant of FIGS. 1-2 and 5-6 may be included in and/or utilized with proppant 40 of FIG. 7 without departing from the scope of the present disclosure.

As illustrated in FIG. 7, crosslinked polymer granules 50 each contain, or each crosslinked polymer granule of the plurality of crosslinked polymer granules contains, a polymeric material 186, which also may be referred to herein as a crosslinked polymeric material 186 and/or as a highly crosslinked polymeric material 186. The highly crosslinked polymeric material 186 includes a plurality of polyethylene polymer chains and a plurality of chemical crosslinks. The plurality of chemical crosslinks includes chemical crosslinks that covalently bond a given polyethylene polymer chain of the plurality of polyethylene polymer chains to another polyethylene polymer chain of the plurality of polyethylene polymer chains.

In some examples, the plurality of polyethylene polymer chains may include a plurality of linear polyethylene polymer chains. In some examples, each polyethylene polymer chain of the plurality of polyethylene polymer chains includes a plurality of methylene repeat units and/or a plurality of ethylene repeat units covalently bonded to one another to form a plurality of carbon-carbon bonds.

In some examples, at least a subset of the plurality of polyethylene polymer chains includes a branched polymer chain. The branched polymer chain may include at least one branch group, which may extend from a polymer backbone of the branched polymer chain. In some such examples, a given chemical crosslink of the plurality of chemical crosslinks may extend from the at least one branch group.

The at least one branch group, when present, may include any suitable number of carbon atoms and/or may have any suitable length. As examples, the at least one branch group may include at least 10, at least 25, at least 50, at least 100, at least 500, at least 1,000, at least 5,000, at least 10,000, at least 25,000, and/or at least 50,000 carbon atoms. The carbon atoms that form the at least one branch group may be arranged linearly, such as along a branch group backbone of the at least one branch group. Alternatively, the carbon atoms that form the at least one branch group may, themselves, form sub-branches. Stated another way, the at least one branch group may, itself, be branched.

In some examples, at least a subset of the plurality of polyethylene polymer chains includes a pendant group that extends from the polymer backbone of the subset of the plurality of polyethylene polymer chains. In some such examples, a given chemical crosslink of the plurality of chemical crosslinks may extend from the pendant group. The pendant group, when present, may include any suitable number of carbon atoms. As examples, the pendant group may include at least 1, at least 2, at least 3, at least 4, at least 5, at least 6, at least 7, at least 8, at least 10, at least 15, at least 20, at most 50, at most 40, at most 30, at most 20, at most 15, at most 12, at most 10, at most 8, and/or at most 6 carbon atoms.

The pendant group may have and/or define any suitable structure, including linear structures, branched structures, cyclic structures, and/or combinations thereof. A specific example of the pendant group includes pendant groups that may decrease, or limit, a degree of crosslinking of the plurality of crosslinked polymer granules, such as via increasing a minimum distance between adjacent polyethylene polymer chains and/or by making it difficult for the polymer backbones of adjacent polyethylene polymer chains to closely pack. Examples of such pendant groups include a methyl group, an ethyl group, a propyl group, a butyl group, a pentyl group, a hexyl group, a heptyl group, an octyl group, a nonyl group, and/or a decyl group.

In some examples, and prior to formation of the plurality of chemical crosslinks, the pendant group may include a ring, a cyclic structure, and/or a double bond, which may permit and/or facilitate formation of a corresponding chemical crosslink. Examples of such pendant groups include a cyclic hydrocarbon, a bridged cyclic hydrocarbon, a norbornene-derived pendant group, an ethylidene-derived pendant group, and/or a vinyl norbornene-derived pendant group.

The plurality of polyethylene polymer chains may be highly crosslinked via the plurality of chemical crosslinks. The plurality of polyethylene polymer chains may have and/or define any suitable degree of crosslinking, or average degree of crosslinking. Examples of the average degree of crosslinking include at least 0.01%, at least 0.1%, at least 1%, at least 2%, at least 3%, at least 4%, at least 5%, at least 6%, at least 8%, at least 10%, at least 12%, at least 14%, at least 16%, at least 18%, at least 20%, at least 25%, at least 30%, at least 35%, at least 40%, at least 45%, and/or at least 50%. In some examples, the highly crosslinked polymeric material within a given crosslinked polymer granule may be so highly crosslinked that the given crosslinked polymer granule may be defined by, at least substantially entirely by, or even entirely by a single polymeric molecule.

As used herein, the phrase "degree of crosslinking" may refer to a mole percentage, or an average mole percentage, of repeat units within a given polyethylene polymer chain that are crosslinked to another polyethylene polymer chain. For example, a polyethylene polymer chain with 100 repeat units and one crosslink would exhibit a "degree of crosslinking" of $1/100=1\%$. Similarly, a polyethylene polymer chain with 100 repeat units and 10 crosslinks would exhibit a "degree of crosslinking" of $10/100=10\%$.

Each chemical crosslink may extend from any suitable portion of a given polyethylene polymer chain to any suitable portion of another polyethylene polymer chain. For example, a chemical crosslink may extend from an ethylene repeat unit of a given polyethylene polymer chain to an ethylene repeat unit of another polyethylene polymer chain to form a covalent bond therebetween. As another example, for examples in which at least a subset of the plurality of polyethylene polymer chains includes a pendant group, a chemical crosslink may extend from a portion of a pendant group included in a given polyethylene polymer chain to a pendant group of another polyethylene polymer chain. Alternatively, the chemical crosslink may extend from a polymer backbone of a given polyethylene polymer chain to a pendant group of another polyethylene polymer chain.

In some examples, the plurality of chemical crosslinks may be distributed, evenly distributed, or even homogeneously distributed throughout the plurality of crosslinked polymer granules. Stated another way, and in these examples, the plurality of chemical cross slinks may be distributed throughout the plurality of crosslinked polymer granules.

In some examples, the plurality of chemical crosslinks may be heterogeneously distributed within each crosslinked polymer granule, such as when the plurality of chemical crosslinks is preferentially distributed proximate an external surface of each crosslinked polymer granule. Stated another way, each crosslinked polymer granule may include an external shell that exhibits a higher degree of crosslinking relative to a remainder of the crosslinked polymer granule.

The plurality of crosslinked polymer granules may have and/or define any suitable structure. As examples, the plurality of crosslinked polymer granules may include and/or be a plurality of high density polyethylene granules and/or a plurality of crosslinked high density polyethylene granules.

In addition, the plurality of crosslinked polymer granules may have and/or define any suitable shape. As examples, the plurality of crosslinked polymer granules may include a plurality of irregularly shaped crosslinked polymer granules, a plurality of spheroid-shaped crosslinked polymer granules, a plurality of at least partially spherical crosslinked polymer granules, a plurality of spherical crosslinked polymer granules, a plurality of at least partially cylindrical crosslinked polymer granules, a plurality of cylindrical crosslinked polymer granules, and/or a plurality of rod-shaped crosslinked polymer granules. In some examples, the plurality of crosslinked polymer granules may include polyethylene particles produced by a polyethylene reactor and subsequently crosslinked to form the plurality of crosslinked polymer granules.

The plurality of crosslinked polymer granules may include recycled polyethylene. As an example, the plurality of crosslinked polymer granules may include at least a threshold fraction of a post-consumer granular polymeric material. Examples of the threshold fraction of the post-consumer granular polymeric material include 5 weight percent, 10 weight percent, 15 weight percent, 20 weight percent, 25 weight percent, 30 weight percent, 40 weight percent, 50 weight percent, 60 weight percent, 70 weight percent, 80 weight percent, 90 weight percent, 95 weight percent, 99 weight percent, and/or 100 weight percent.

A characteristic dimension of each crosslinked polymer granule is within a threshold characteristic dimension range of at least 10 micrometers and at most 5 millimeters. As more specific examples, a lower limit of the characteristic dimension range may be at least 10 micrometers, at least 15 micrometers, at least 20 micrometers, at least 25 micrometers, at least 30 micrometers, at least 40 micrometers, at least 50 micrometers, at least 75 micrometers, at least 100 micrometers, at least 125 micrometers, at least 150 micrometers, at least 200 micrometers, at least 250 micrometers, at least 300 micrometers, at least 400 micrometers, at least 500 micrometers, at least 600 micrometers, at least 700 micrometers, at least 800 micrometers, at least 900 micrometers, and/or at least 1,000 micrometers. Additionally or alternatively, an upper limit of the characteristic dimension range may be at most 5 millimeters, at most 3.5 millimeters, at most 3 millimeters, at most 2.5 millimeters, at most 2 millimeters, at most 1.5 millimeters, at most 1.25 millimeters, at most 1 millimeter, at most 900 micrometers, at most 800 micrometers, at most 700 micrometers, at most 600 micrometers, at most 500 micrometers, at most 400 micrometers, and/or at most 300 micrometers.

Examples of the characteristic dimension include a maximum extent of each crosslinked polymer granule and/or a diameter of each crosslinked polymer granule. Additional examples of the characteristic dimension include an effective diameter of each crosslinked polymer granule and/or a minimum diameter of a sphere that fully contains each crosslinked polymer granule.

As illustrated in dashed lines in FIG. 7, the plurality of crosslinked polymer granules 50 may contain a property-modifying filler 180. The property-modifying filler 180, when present, may be configured to modify at least one property of the plurality of crosslinked polymer granules 50. This property modification may be relative and/or compared to a corresponding crosslinked polymer granule that includes the highly crosslinked polymeric material but that does not include the property-modifying filler. With this in mind, crosslinked polymer granules 50 that include property-modifying filler 180, according to the present disclosure, also may be referred to herein as filled crosslinked polymer granules 50, filled highly crosslinked polymer granules, modified highly crosslinked polymer granules 50, and/or a property-modified highly crosslinked polymer granules 50. Property-modifying filler 180 additionally or alternatively may be referred to herein as a property-modifying material 180 and/or as property-modifying additive 180.

Property-modifying filler 180 may include any suitable material and/or materials that may modify, that may be configured to modify, and/or that may be selected to modify and/or to selectively modify the at least one property of the plurality of crosslinked polymer granules. Examples of the property-modifying filler include silica, talc, carbon black, a tracer material 60, a glass fiber, a metal, and/or another polymer (e.g., other than polyethylene). Examples of the tracer material include a radio frequency identification tag, a chemical tracer material that is chemically distinct from a remainder of the crosslinked polymer granules, and/or a radioactive tracer material.

In some examples, the property-modifying filler may be distributed, may be uniformly distributed, and/or may be homogeneously distributed in and/or within each crosslinked polymer granule 50. In some examples, each crosslinked polymer granule 50 may include at least one property-modifying filler domain 181 and at least one highly crosslinked polymeric material domain 187. In some such examples, the at least one property-modifying filler domain and the at least one highly crosslinked polymeric material domain may be adhered to one another to form and/or define a corresponding crosslinked polymer granule. In some examples, the at least one highly crosslinked polymeric material domain may surround and/or encapsulate the at least one property-modifying filler domain. In some examples, the at least one property-modifying filler domain may surround and/or encapsulate the at least one highly crosslinked polymeric material domain. As indicated in dashed lines in FIG. 7, tracer material 60, when present, may be incorporated into and/or may form a portion of property-modifying filler domain 181 and/or of crosslinked polymeric material domain 187.

It is within the scope of the present disclosure that the property-modifying filler may modify the at least one property of the plurality of crosslinked polymer granules. As an example, a composition of the property-modifying filler may be selected such that the at least one property of the plurality of crosslinked polymer granules is within a desired property range and/or such that the at least one property of the plurality of crosslinked polymer granules is greater or less than a corresponding property of the highly crosslinked polymeric material. As another example, a weight percentage of the property-modifying filler within the plurality of crosslinked polymer granules may be selected such that the at least one property of the plurality of crosslinked polymer granules is within the desired property range, such that the at least one property of the plurality of crosslinked polymer granules is greater than the corresponding property of the highly crosslinked polymeric material, or such that the at least one property of the plurality of crosslinked polymer granules is less than the corresponding property of the highly crosslinked polymeric material.

The at least one property of the plurality of crosslinked polymer granules may include and/or be any suitable, desired, and/or selected property of the plurality of crosslinked polymer granules. As examples, the at least one property of the plurality of crosslinked polymer granules may include one or more of a thermal stability of the plurality of crosslinked polymer granules, a glass transition temperature of the plurality of crosslinked polymer granules, a mechanical hardness of the plurality of crosslinked polymer granules, a mechanical strength of the plurality of crosslinked polymer granules, a Young's Modulus of the plurality of crosslinked polymer granules, a resistance to oil absorption of the plurality of crosslinked polymer granules, a traceability of detectability of the plurality of crosslinked polymer granules, a magnetic property of the plurality of crosslinked polymer granules, a chemical property of the plurality of crosslinked polymer granules, an electrical property of the plurality of crosslinked polymer granules, and/or a chemical reactivity of the plurality of crosslinked polymer granules. In such examples, the corresponding property of the highly crosslinked polymeric material may include and/or be a thermal stability of the highly crosslinked polymeric material, a glass transition temperature of the highly crosslinked polymeric material, a mechanical hardness of the highly crosslinked polymeric material, a mechanical strength of the highly crosslinked polymeric material, a Young's Modulus of the highly crosslinked polymeric material, a resistance to oil absorption of the highly crosslinked polymeric material, a traceability of detectability of the highly crosslinked polymeric material, a magnetic property of the highly crosslinked polymeric material, a chemical property of the highly crosslinked polymeric material, an electrical property of the highly crosslinked polymeric material, and/or a chemical reactivity of the highly crosslinked polymeric material.

As a more specific example, the at least one property of the plurality of crosslinked polymer granules may include and/or be a density of the plurality of crosslinked polymer granules. As an example, a composition of the property-modifying filler and/or a weight percentage of the property-modifying filler within the plurality of crosslinked polymer granules may be selected such that the density of the plurality of crosslinked polymer granules is within a desired density range. In some examples, the desired density range may be greater than a polymeric material density of the highly crosslinked polymeric material. Stated another way, a filler density of the property-modifying filler may be greater than the polymeric material density. In some examples, the desired density range may be less than the polymeric material density of the highly crosslinked polymeric material. Stated another way, the filler density may be less than the polymeric material density of the highly crosslinked polymeric material.

Examples of a lower bound, or limit, on the desired density range include a lower bound of at least 0.7 grams per cubic centimeter (g/cc), at least 0.75 g/cc, at least 0.8 g/cc, at least 0.85 g/cc, at least 0.9 g/cc, at least 0.95 g/cc, at least 1.0 g/cc, and/or at least 1.05 g/cc. Examples of an upper bound, or limit, on the desired density range include an upper bound of at most 2.0 g/cc, at most 1.9 g/cc, at most 1.8 g/cc, at most 1.7 g/cc, at most 1.6 g/cc, at most 1.5 g/cc, at most 1.4 g/cc, at most 1.3 g/cc, at most 1.2 g/cc, at most 1.1 g/cc, at most 1.0 g/cc, and/or at most 0.95 g/cc.

Examples of the polymeric material density include polymeric material densities of at least 0.85 g/cc, at least 0.86 g/cc, at least 0.87 g/cc, at least 0.88 g/cc, at least 0.89 g/cc, at least 0.9 g/cc, at least 0.91 g/cc, at least 0.92 g/cc, at least 0.93 g/cc, at least 0.94 g/cc, at least 0.95 g/cc, at most 0.96 g/cc, at most 0.97 g/cc, and/or at most 0.98 g/cc. Examples of the filler density include filler densities of at least 0.5 g/cc, at least 0.6 g/cc, at least 0.7 g/cc, at least 0.8 g/cc, at most 0.85 g/cc, at most 0.8 g/cc, and/or at most 0.75 g/cc. Additional and/or alternative examples of the filler density include filler densities of at least 2.0 g/cc, at least 2.1 g/cc, at least 2.2 g/cc, at least 2.3 g/cc, at least 2.5 g/cc, at least 3 g/cc, at least 3.5 g/cc, at most 9 g/cc, at most 8 g/cc, at most 7 g/cc, at most 6 g/cc, at most 5 g/cc, at most 4 g/cc, at most 3 g/cc, at most 2.75 g/cc, at most 2.5 g/cc, at most 2.25 g/cc, and/or at most 2 g/cc.

Each crosslinked polymer granule may have and/or define a corresponding granule density. In some examples, the corresponding granule density may be equal, or at least substantially equal, for each, or for every, crosslinked polymer granule. In some examples, a first subset of the plurality of crosslinked polymer granules may have and/or define a first granule density and a second subset of the plurality of crosslinked polymer granules may have and/or define a second granule density, which may differ from the first granule density.

The corresponding granule density of the plurality of crosslinked polymer granules may define, or may be referred to herein as defining, a granule density distribution. The granule density distribution may have and/or define any suitable distribution shape. Examples of the distribution shape include a constant distribution, an at least substantially constant distribution, a single-mode distribution, an at least substantially single-mode distribution, a multi-modal distribution, an at least substantially multi-modal distribution, a bimodal distribution, an at least substantially bimodal distribution, a trimodal distribution, an at least substantially trimodal distribution, a normal distribution, and/or an at least substantially normal distribution.

As used herein, the phrase "highly crosslinked" may be utilized to modify and/or to describe polymeric material and/or polymer granules that are at least partially formed from the polymeric material. Such polymeric material and/or polymer granules, when "highly crosslinked," include polyethylene polymer chains with a degree of crosslinking sufficient to provide the highly crosslinked polymeric material and/or the highly crosslinked polymer granules with one or more of the below-described properties. Stated another way, a degree of crosslinking needed to provide the polymeric material and/or the polymer granules with one or more of the below-described properties indicates that the polymeric material is a highly crosslinked polymeric material and/or that the polymer granules are highly crosslinked polymer granules in the context of the instant disclosure.

As an example, and upon fluid contact with naturally occurring liquid hydrocarbons, such as crude oil, within a hydrocarbon well, the crosslinked polymer granules disclosed herein may undergo less than a threshold increase in mass due to absorption of the naturally occurring liquid hydrocarbons. Examples of the threshold increase in mass include threshold increases of 0.05%, 0.1%, 0.25%, 0.5%, 0.75%, 1%, 2%, 3%, 4%, and/or 5%.

As another example, and upon fluid contact with crude oil for a time period of 8 weeks, at a temperature of 85 degrees Celsius, and under a uniaxial stress of 35 Megapascals, the crosslinked polymer granules disclosed herein undergo at most a threshold increase in strain. Examples of the threshold increase in strain include increases of 1%, 2%, 3%, 4%, 5%, 6%, 8%, and/or 10%.

As yet another example, and when subjected to a confining stress of 42 Megapascals at a temperature of 85 degrees Celsius, a monolayer of the crosslinked polymer granules disclosed herein defines at least a threshold fluid conductivity. Examples of the threshold fluid conductivity include fluid conductivities of $0.5 \times 10^4$ micrometers$^3$, $1.0 \times 10^4$ micrometers$^3$, $1.5 \times 10^4$ micrometers$^3$, $1.75 \times 10^4$ micrometers$^3$, $2 \times 10^4$ micrometers$^3$, $2.25 \times 10^4$ micrometers$^3$, $2.75 \times 10^4$ micrometers$^3$, $3 \times 10^4$ micrometers$^3$, $3.5 \times 10^4$ micrometers$^3$, $4 \times 10^4$ micrometers$^3$, $4.5 \times 10^4$ micrometers$^3$, $5 \times 10^4$ micrometers$^3$, and/or $6 \times 10^4$ micrometers$^3$.

As another example, the crosslinked polymer granules disclosed herein may have at least a threshold onset of melting temperature. Examples of the threshold onset of melting temperature include temperatures of 40 degrees Celsius, 45 degrees Celsius, 50 degrees Celsius, 55 degrees Celsius, 60 degrees Celsius, 65 degrees Celsius, 70 degrees Celsius, 75 degrees Celsius, 80 degrees Celsius, 85 degrees Celsius, 90 degrees Celsius, 95 degrees Celsius, 100 degrees Celsius, 105 degrees Celsius, and/or 110 degrees Celsius.

As yet another example, the crosslinked polymer granules disclosed herein may have at least a threshold melting temperature. Examples of the threshold melting temperature include temperatures of 60 degrees Celsius, 65 degrees Celsius, 70 degrees Celsius, 75 degrees Celsius, 80 degrees Celsius, 85 degrees Celsius, 90 degrees Celsius, 95 degrees Celsius, 100 degrees Celsius, 105 degrees Celsius, 110 degrees Celsius, 115 degrees Celsius, 120 degrees Celsius, 125 degrees Celsius, 130 degrees Celsius, and/or 135 degrees Celsius.

As another example, the crosslinked polymer granules disclosed herein may exhibit less than a threshold strain when subject to a stress of 35 Megapascals at a temperature of 85 degrees Celsius. Examples of the threshold strain include threshold strains of 40%, 39%, 38%, 37%, 36%, 35%, 34%, 33%, 32%, 31%, and/or 30%.

As yet another example, and when compared to analogous uncrosslinked polymer granules, the crosslinked polymer granules disclosed herein may exhibit at least a threshold decrease in strain when subject to a stress of 35 Megapascals at a temperature of 85 degrees Celsius. Examples of the threshold decrease in strain include decreases of 10%, 9%, 8%, 7%, 6%, 5%, 4%, 3%, and/or 2%.

As used herein, the phrase "analogous uncrosslinked polymer granule," when utilized to compare to the crosslinked polymer granules disclosed herein, may include an uncrosslinked polymer granule that has and/or defines an identical chemical structure to that of the crosslinked polymer granules with the exception that the uncrosslinked polymer granule does not include the plurality of chemical crosslinks. Stated another way, a granular polymeric material may be crosslinked to form and/or define the crosslinked polymer granules, and the analogous uncrosslinked polymer granules may refer to the granular polymeric material prior to being crosslinked to form the crosslinked polymer granules.

The highly crosslinked polymeric material and/or the crosslinked polymer granules disclosed herein may, in addition to one or more of the above-described properties, also, or optionally also, exhibit one or more of the below-described properties. As an example, the crosslinked polymer granules may define a granule density. Examples of the granule density include densities of at least 0.8 g/cc, at least 0.82 g/cc, at least 0.84 g/cc, at least 0.86 g/cc, at least 0.88 g/cc, at least 0.9 g/cc, at least 0.92 g/cc, at least 0.94 g/cc, at least 0.96 g/cc, at least 0.98 g/cc, at least 1 g/cc, at most 2.6 g/cc, at most 2.4 g/cc, at most 2.2 g/cc, at most 2 g/cc, at most 1.8 g/cc, at most 1.6 g/cc, at most 1.4 g/cc, at most 1.2 g/cc, at most 1.1 g/cc, at most 1 g/cc, at most 0.99 g/cc, at most 0.98 g/cc, at most 0.97 g/cc, and/or at most 0.96 g/cc.

As another example, and when compared to the analogous uncrosslinked polymer granules, the crosslinked polymer granules may resist fusing when exposed to a compressive force. Stated another way, fusing of the crosslinked polymer granules may be quantitatively less than fusing of the analogous uncrosslinked polymer granules. As examples, fusing of the crosslinked polymer granules may be at least 10% less, at least 20% less, at least 30% less, at least 40% less, at least 50% less, at least 60% less, at least 70% less, at least 80% less, and/or at least 90% less than fusing of the analogous uncrosslinked polymer granules when exposed to the compressive force.

As yet another example, and when compared to the analogous uncrosslinked polymer granules, the crosslinked polymer granules may resist flowing when exposed to the compressive force. Stated another way, the flow of the crosslinked polymer granules may be quantitatively less than the flow of the analogous uncrosslinked polymer granules. As examples, flow of the crosslinked polymer granules may be at least 10% less, at least 20% less, at least 30% less, at least 40% less, at least 50% less, at least 60% less, at least 70% less, at least 80% less, and/or at least 90% less than the flow of the analogous uncrosslinked polymer granules when exposed to the compressive force.

As another example, and when compared to the analogous uncrosslinked polymer granules, the crosslinked polymer granules may maintain fluid permeability when exposed to the compressive force. Stated another way, the fluid permeability of the crosslinked polymer granules may decrease to a lesser extent when compared to fluid permeability of the analogous uncrosslinked polymer granules. As examples, fluid permeability of the crosslinked polymer granules may decrease at least 10% less, at least 20% less, at least 30% less, at least 40% less, at least 50% less, at least 60% less, at least 70% less, at least 80% less, and/or at least 90% less than the fluid permeability of the analogous uncrosslinked polymer granules when exposed to the compressive force.

The crosslinked polymer granules disclosed and/or utilized herein may be formed in any suitable manner. As an example, the crosslinked polymer granules may be formed from a granular polymeric material that is crosslinked in a crosslinking apparatus, such as an electron beam irradiation system. As another example, the granular polymer material may be combined with a crosslinking agent to form a material-agent mixture, which may be extruded. Extrusion of the granular polymeric material in the presence of the crosslinking agent may cause the granular polymeric material to crosslink, forming an extruded highly crosslinked polymeric material. In some examples, the extruded highly crosslinked polymeric material may define, or directly define, the crosslinked polymer granules. In some examples, the extruded highly crosslinked polymeric material may be severed to form and/or define the crosslinked polymer granules. Examples of the crosslinking agent include a peroxide, an organic peroxide, di-(2,4-dichlorobenzoyl) peroxide, tert-butyl peroxybenzoate, 1,1-di-(tert-butylperoxy)-3,3,5-trimethylecyclohexane, dicumyl peroxide, tert-butyl cumyl peroxide, di-tert-butyl peroxide, 2,5-dimethyl-2,5-di(tert-butylperoxy)hexyne-3, 2,5-di(2-tert-butyl peroxyisopropyl)-benzene, 2,5-dimethyl-2,5-di(tert-butylperoxy) hexane, a silane, and/or an azo compound.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order and/or concurrently.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, "at least substantially," when modifying a degree or relationship, may include not only the recited "substantial" degree or relationship, but also the full extent of the recited degree or relationship. A substantial amount of a recited degree or relationship may include at least 75% of the recited degree or relationship. For example, an object that is at least substantially formed from a material includes objects for which at least 75% of the objects are formed from the material and also includes objects that are completely formed from the material. As another example, a first length that is at least substantially as long as a second length includes first lengths that are within 75% of the second length and also includes first lengths that are as long as the second length.

INDUSTRIAL APPLICABILITY

The systems and methods disclosed herein are applicable to the oil and gas industries.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions, and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements, and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A hydrocarbon well, comprising:
a wellbore that extends within a subsurface region;
a downhole tubular that extends within the wellbore and defines a tubular conduit;
a plurality of perforations formed within the downhole tubular;
a plurality of fractures formed within the subsurface region; and
a proppant positioned within the plurality of fractures, wherein the proppant includes a plurality of crosslinked polymer granules, wherein a characteristic dimension of each crosslinked polymer granule of the plurality of crosslinked polymer granules is at least 100 micrometers and at most 2 millimeters, and further wherein each crosslinked polymer granule contains a highly crosslinked polymeric material that includes:
  (i) a plurality of polyethylene polymer chains; and
  (ii) a plurality of chemical crosslinks, wherein the plurality of chemical crosslinks includes chemical crosslinks that covalently bond a given polyethylene polymer chain of the plurality of polyethylene polymer chains to another polyethylene polymer chain of the plurality of polyethylene polymer chains, and
    wherein a degree of crosslinking of the highly crosslinked polymeric material is selected such that the plurality of crosslinked polymer granules exhibit at least a threshold increase in mass of less than 5% upon contact with hydrocarbon liquid.

2. The hydrocarbon well of claim 1, wherein the proppant further includes a tracer material, wherein the tracer material is configured to dissolve within a hydrocarbon fluid that extends within the wellbore of the hydrocarbon well and to be detected upon production of the hydrocarbon fluid from the hydrocarbon well within a produced fluid stream.

3. The hydrocarbon well of claim 2, wherein the hydrocarbon well further includes a tracer detection structure configured to detect the tracer material within the produced fluid stream.

4. The hydrocarbon well of claim 2, wherein the tracer material is a first tracer material that is associated with the proppant positioned within a first fracture of the plurality of fractures, wherein the proppant further includes a second tracer material that is associated with the proppant positioned within a second fracture of the plurality of fractures, and further wherein the first tracer material differs from the second tracer material.

5. The hydrocarbon well of claim 1, wherein the proppant further includes a conventional proppant.

6. The hydrocarbon well of claim 5, wherein the conventional proppant has a density of at least 0.9 grams per cubic centimeter.

7. The hydrocarbon well of claim 5, wherein the conventional proppant and the plurality of crosslinked polymer granules both are positioned within each fracture of the plurality of fractures.

8. The hydrocarbon well of claim 5, wherein the conventional proppant is preferentially positioned within a first fracture subset of the plurality of fractures, and further wherein the plurality of crosslinked polymer granules is preferentially positioned within a second fracture subset of the plurality of fractures.

9. The hydrocarbon well of claim 1, wherein a first granule subset of the plurality of crosslinked polymer granules defines a first average granule density, wherein a second granule subset of the plurality of crosslinked polymer granules defines a second average granule density, and further wherein the first granule subset and the second granule subset are at least substantially equally distributed among the plurality of fractures.

10. The hydrocarbon well of claim 1, wherein a first granule subset of the plurality of crosslinked polymer granules defines a first average granule density, wherein a second granule subset of the plurality of crosslinked polymer granules defines a second average granule density, wherein the first granule subset is preferentially positioned within a first fracture subset of the plurality of fractures, and further wherein the second granule subset is preferentially positioned within a second fracture subset of the plurality of fractures.

11. The hydrocarbon well of claim 1, wherein the degree of crosslinking of the highly crosslinked polymeric material is further selected such that the plurality of crosslinked polymer granules exhibit one or more of:
(1) a threshold fluid conductivity of a monolayer of the plurality of crosslinked polymer granules of less than $6 \times 10^4$ micrometers' under a confining stress of 42 Megapascals at a temperature of 85 degrees Celsius;
(2) a threshold onset of melting temperature of less than 110 degrees Celsius;
(3) a threshold melting temperature of less than 135 degrees Celsius; and
(4) a threshold strain of less than 30% under a stress of 35 Megapascals at a temperature of 85 degrees Celsius.

12. A method of completing a hydrocarbon well, the method comprising:
positioning a perforation device within a tubular conduit of a downhole tubular, wherein the downhole tubular extends within a wellbore of the hydrocarbon well, and further wherein the wellbore extends within a subsurface region;
perforating the downhole tubular with the perforation device to define a perforation within the downhole tubular;
pressurizing the tubular conduit with a pressurizing fluid stream, which includes a pressurizing fluid, to fracture a zone of the subsurface region that is proximate the perforation; and
flowing a proppant into a fracture, via the perforation, to prop the fracture with the proppant, wherein the proppant includes a plurality of crosslinked polymer granules, wherein a characteristic dimension of each crosslinked polymer granule of the plurality of crosslinked polymer granules is at least 100 micrometers and at most 2 millimeters, and further wherein each crosslinked polymer granule contains a highly crosslinked polymeric material that includes:
(i) a plurality of polyethylene polymer chains; and
(ii) a plurality of chemical crosslinks, wherein the plurality of chemical crosslinks includes chemical crosslinks that covalently bond a given polyethylene polymer chain of the plurality of polyethylene polymer chains to another polyethylene polymer chain of the plurality of polyethylene polymer chains, and
wherein a degree of crosslinking of the highly crosslinked polymeric material is selected such that the plurality of crosslinked polymer granules exhibit at least a threshold increase in mass of less than 5% upon contact with hydrocarbon liquid.

13. The method of claim 12, wherein the flowing the proppant includes flowing the proppant into the fracture within the pressurizing fluid stream.

14. The method of claim 13, wherein an average density of the plurality of crosslinked polymer granules is at least 90% and at most 110% of a density of the pressurizing fluid.

15. The method of claim 13, wherein the plurality of crosslinked polymer granules is positively or negatively buoyant within the pressurizing fluid.

16. The method of claim 13, wherein a positively buoyant fraction of the plurality of crosslinked polymer granules is positively buoyant within the pressurizing fluid, and further wherein a negatively buoyant fraction of the plurality of crosslinked polymer granules is negatively buoyant within the pressurizing fluid stream.

17. The method of claim 12, wherein the proppant further includes a conventional proppant, wherein the flowing the proppant includes concurrently flowing both the conventional proppant and the plurality of crosslinked polymer granules into the fracture.

18. The method of claim 12, wherein the proppant further includes a conventional proppant, wherein the flowing the proppant includes initially flowing one of the conventional proppant and the plurality of crosslinked polymer granules into the fracture and subsequently flowing the other of the conventional proppant and the plurality of crosslinked polymer granules into the fracture.

19. The method of claim 12, wherein the proppant further includes a conventional proppant, wherein the method further includes repeating the positioning, the perforating, the pressurizing, and the flowing to fracture and prop a plurality of spaced-apart zones of the subsurface region.

20. The method of claim 19, wherein the flowing includes flowing both the conventional proppant and the plurality of crosslinked polymer granules into fractures associated with each zone of the plurality of spaced-apart zones.

21. The method of claim 19, wherein the flowing includes preferentially flowing the conventional proppant into fractures associated with a first zone subset of the plurality of spaced-apart zones and preferentially flowing the plurality of crosslinked polymer granules into fractures associated with a second zone subset of the plurality of spaced-apart zones.

22. A method of operating a hydrocarbon well, the method comprising:
   producing a produced fluid stream, which includes a hydrocarbon fluid, from the hydro-carbon well, wherein the producing includes flowing the hydrocarbon fluid from a subsurface region and into a tubular conduit of a downhole tubular of the hydrocarbon well via a fracture that extends within the subsurface region, wherein the downhole tubular extends within the subsurface region, wherein a proppant is positioned within the fracture, and further wherein the proppant is at least partially defined by a plurality of crosslinked polymer granules and a tracer material, wherein a characteristic dimension of each crosslinked polymer granule of the plurality of crosslinked polymer granules is at least 100 micrometers and at most 2 millimeters, and further wherein each crosslinked polymer granule contains a highly crosslinked polymeric material that includes:
   (i) a plurality of polyethylene polymer chains; and
   (ii) a plurality of chemical crosslinks, wherein the plurality of chemical crosslinks includes chemical crosslinks that covalently bond a given polyethylene polymer chain of the plurality of polyethylene polymer chains to another polyethylene polymer chain of the plurality of polyethylene polymer chains, and
      wherein a degree of crosslinking of the highly crosslinked polymeric material is selected such that the plurality of crosslinked polymer granules exhibit at least a threshold increase in mass of less than 5% upon contact with hydrocarbon liquid;
   during the flowing, entraining a fraction of the tracer material within the hydrocarbon fluid; and
   during the producing, detecting a presence of the tracer material within the hydrocarbon fluid produced from the hydrocarbon well.

23. The method of claim 22, wherein the detecting includes detecting with a tracer detection structure of the hydrocarbon well.

24. The method of claim 22, wherein the entraining includes dissolving the fraction of the tracer material within the hydrocarbon fluid.

25. The method of claim 22, wherein the method further includes determining that the hydro-carbon fluid was produced via the fracture based, at least in part, on the detecting.

26. The method of claim 22, wherein the hydrocarbon well includes a plurality of fractures, wherein each fracture of the plurality of fractures includes a corresponding tracer material, wherein the producing includes producing the hydrocarbon fluid via the plurality of fractures, wherein the entraining includes entraining a corresponding fraction of the corresponding tracer material from each fracture of the plurality of fractures, and further wherein the detecting includes detecting a presence of the corresponding tracer material from each fracture of the plurality of fractures.

27. The method of claim 26, wherein the method further includes estimating a production volume from each fracture of the plurality of fractures based, at least in part, on the detecting.

* * * * *